US011728954B1

(12) United States Patent
Kutz et al.

(10) Patent No.: US 11,728,954 B1
(45) Date of Patent: Aug. 15, 2023

(54) DIGITAL POST-DISTORTION CORRECTION

(71) Applicant: QUALCOMM Incorporated, San Diego, CA (US)

(72) Inventors: Gideon Shlomo Kutz, Ramat Hasharon (IL); Amit Bar-Or Tillinger, Tel-Aviv (IL); Elad Meir, Ramat Gan (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/653,242

(22) Filed: Mar. 2, 2022

(51) Int. Cl.
*H04L 5/00* (2006.01)

(52) U.S. Cl.
CPC ............ *H04L 5/006* (2013.01); *H04L 5/0051* (2013.01)

(58) Field of Classification Search
CPC .................. H04B 1/0475; H04B 1/109; H04B 2001/0425; H04B 17/13; H04B 7/0639; H04B 1/123; H04B 17/309; H04B 7/0626; H04B 1/04; H04L 25/0226; H04L 25/03019; H04L 25/03343; H04L 7/0091; H04L 1/0039; H04L 25/49; H04W 72/23; H04W 8/24; H04W 52/0258; H04W 52/365; H04W 52/367; H04W 72/21

USPC ......................................................... 375/267
See application file for complete search history.

(56) References Cited

U.S. PATENT DOCUMENTS

| 11,258,648 B1 * | 2/2022 | Landis ................ H04W 72/23 |
| 2022/0312403 A1 * | 9/2022 | Landis ................ H04W 72/51 |
| 2022/0368584 A1 * | 11/2022 | Kutz .................. H04L 27/2614 |

FOREIGN PATENT DOCUMENTS

WO    WO-2021223211 A1 *  11/2021

* cited by examiner

*Primary Examiner* — Eva Y Puente
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive downlink signaling configured to support obtaining spatial basis functions associated with antenna ports of a network node. The UE may receive a downlink communication from the network node, the receiving the downlink communication including decoding the downlink communication using digital post-distortion (DPoD) correction that is based at least in part on the spatial basis functions. Numerous other aspects are described.

30 Claims, 9 Drawing Sheets

DIGITAL POST-DISTORTION CORRECTION

FIELD OF THE DISCLOSURE

Aspects of the present disclosure generally relate to wireless communication and to techniques and apparatuses for digital post-distortion correction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving downlink signaling configured to support obtaining spatial basis functions associated with antenna ports of a network node. The method may include receiving a downlink communication from the network node, the receiving the downlink communication including decoding the downlink communication using digital post-distortion (DPoD) correction that is based at least in part on the spatial basis functions.

Some aspects described herein relate to a method of wireless communication performed by a network node. The method may include transmitting downlink signaling configured to support a UE in obtaining spatial basis functions associated with antenna ports of the network node. The method may include transmitting a downlink communication having DPoD that is associated with the spatial basis functions.

Some aspects described herein relate to a UE for wireless communication. The UE may include a memory and one or more processors coupled to the memory. The one or more processors may be configured to receive downlink signaling configured to support obtaining spatial basis functions associated with antenna ports of a network node. The one or more processors may be configured to receive a downlink communication from the network node, the receiving the downlink communication including decoding the downlink communication using DPoD correction that is based at least in part on the spatial basis functions.

Some aspects described herein relate to a network node for wireless communication. The network node may include a memory and one or more processors coupled to the memory. The one or more processors may be configured to transmit downlink signaling configured to support a UE in obtaining spatial basis functions associated with antenna ports of the network node. The one or more processors may be configured to transmit a downlink communication having DPoD that is associated with the spatial basis functions.

Some aspects described herein relate to a non-transitory computer-readable medium that stores a set of instructions for wireless communication by a UE. The set of instructions, when executed by one or more processors of the UE, may cause the UE to receive downlink signaling configured to support obtaining spatial basis functions associated with antenna ports of a network node. The set of instructions, when executed by one or more processors of the UE, may cause the UE to receive a downlink communication from the network node, the receiving the downlink communication including decoding the downlink communication using DPoD correction that is based at least in part on the spatial basis functions.

Some aspects described herein relate to a non-transitory computer-readable medium that stores a set of instructions for wireless communication by a network node. The set of instructions, when executed by one or more processors of the network node, may cause the network node to transmit downlink signaling configured to support a UE in obtaining spatial basis functions associated with antenna ports of the network node. The set of instructions, when executed by one or more processors of the network node, may cause the network node to transmit a downlink communication having DPoD that is associated with the spatial basis functions.

Some aspects described herein relate to an apparatus for wireless communication. The apparatus may include means for receiving downlink signaling configured to support obtaining spatial basis functions associated with antenna ports of a network node. The apparatus may include means for receiving a downlink communication from the network node, the receiving the downlink communication including decoding the downlink communication using DPoD correction that is based at least in part on the spatial basis functions.

Some aspects described herein relate to an apparatus for wireless communication. The apparatus may include means for transmitting downlink signaling configured to support a UE in obtaining spatial basis functions associated with antenna ports of the network node. The apparatus may include means for transmitting a downlink communication having DPoD that is associated with the spatial basis functions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
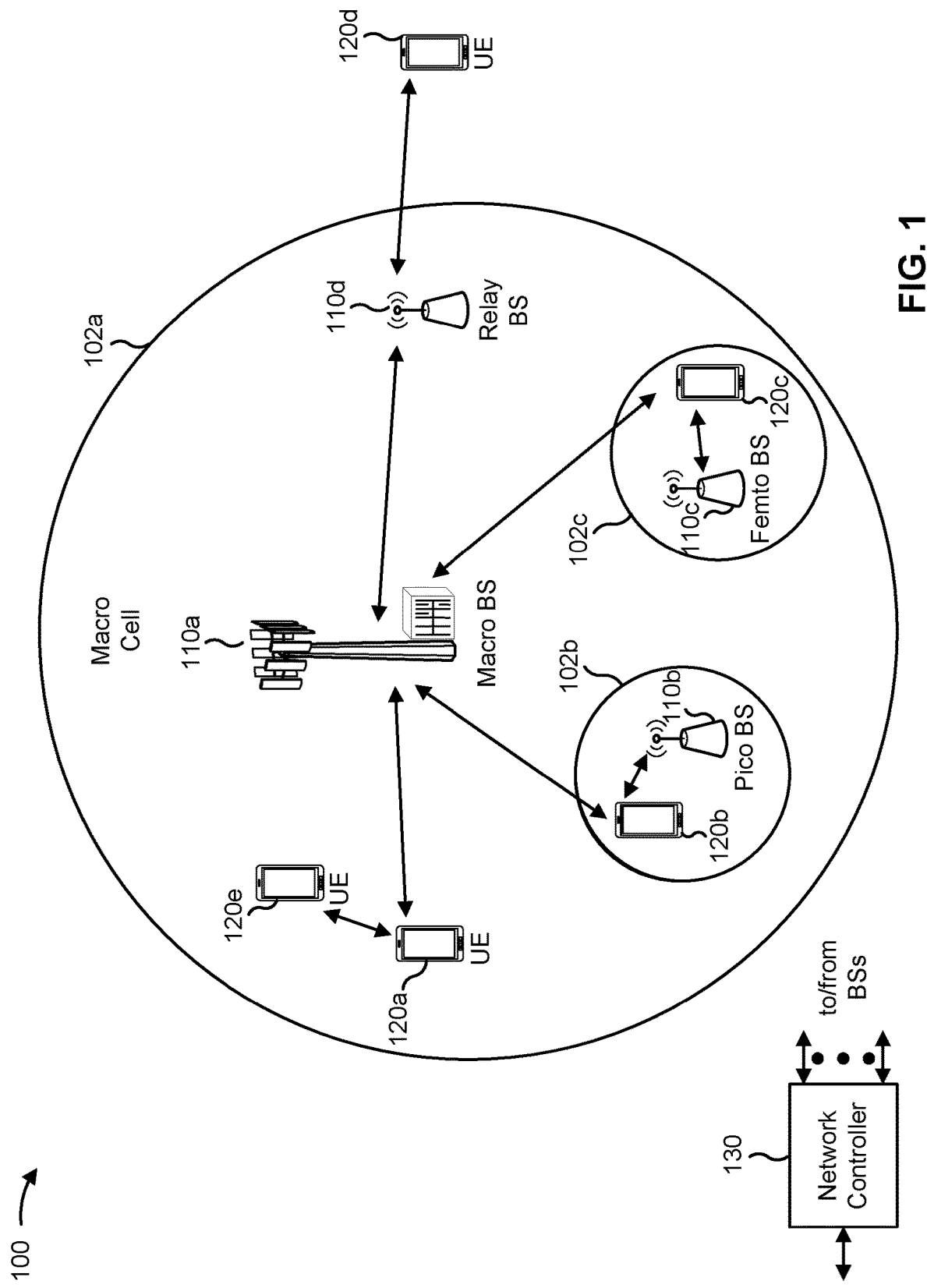
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some networks, the base station may be part of a distributed radio access network (RAN) (D-RAN), an open RAN (e.g., O-RAN), a centralized RAN (C-RAN), or a virtualized RAN (vRAN), among other examples, in which one or more functions of a base station are divided among multiple devices. For example, the base station may include, and/or may be included in, a centralized unit (CU), a distributed unit (DU), and/or a radio unit (RU) (e.g., a remote radio head (RRH)), each performing functions associated with communication via the wireless network 100. In some examples, the centralized unit and the distributed unit may perform processing associated with one or more protocol layers of a communication, and the radio unit may perform over the air (OTA) physical layer operations, such as transmission and reception via one or more antennas of the radio unit.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive downlink signaling configured to support obtaining spatial basis functions associated with antenna ports of a network node; and receive a downlink communication from the network node, the receiving the downlink communication including decoding the downlink communication using digital post-distortion (DPoD) correction that is based at least in part on the spatial basis functions. Additionally, or alternatively, the communication manager 140 may perform one or more other operations described herein.

In some aspects, a network node (e.g., one or more devices of a base station 110 with a RAN, such as a CU, a DU, and/or an RU) may include a communication manager 150. As described in more detail elsewhere herein, the communication manager 150 may transmit downlink signaling configured to support a UE in obtaining spatial basis functions associated with antenna ports of the network node; and transmit a downlink communication having DPoD that is associated with the spatial basis functions. Additionally, or alternatively, the communication manager 150 may perform one or more other operations described herein.

As indicated above, FIG. 1 is provided as an example. Other examples may differ from what is described with regard to FIG. 1.

Figure 2:
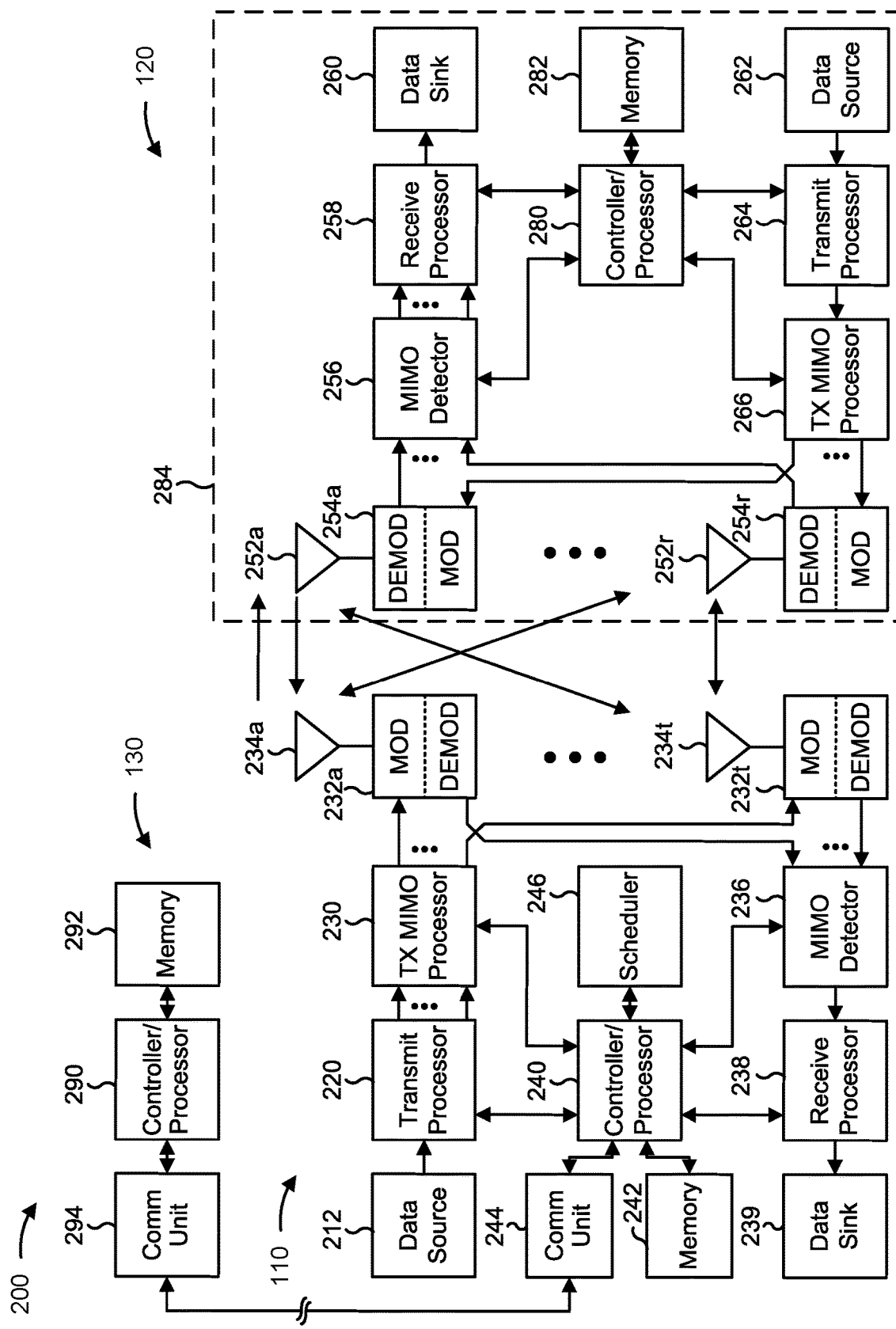
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with DPoD correction, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving downlink signaling configured to support obtaining spatial basis functions associated with antenna ports of a network node (e.g., using communication manager 140 antenna 252, modem 254, MIMO detector 256, receive processor 258, controller/processor 280, and/or memory 282, among other examples); and/or means for receiving a downlink communication from the network node, the receiving the downlink communication including decoding the downlink communication using DPoD correction that is based at least in part on the spatial basis functions (e.g., using communication manager 140, antenna 252, modem 254, MIMO detector 256, receive processor 258, controller/processor 280, and/or memory 282, among other examples).

In some aspects, the network node includes means for transmitting downlink signaling configured to support a UE in obtaining spatial basis functions associated with antenna ports of the network node (e.g., using communication manager 150, controller/processor 240, transmit processor 220, TX MIMO processor 230, modem 232, antenna 234, and/or memory 242, among other examples); and/or means for transmitting a downlink communication having DPoD that is associated with the spatial basis functions (e.g., using communication manager 150, controller/processor 240, transmit processor 220, TX MIMO processor 230, modem 232, antenna 234, and/or memory 242, among other examples).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
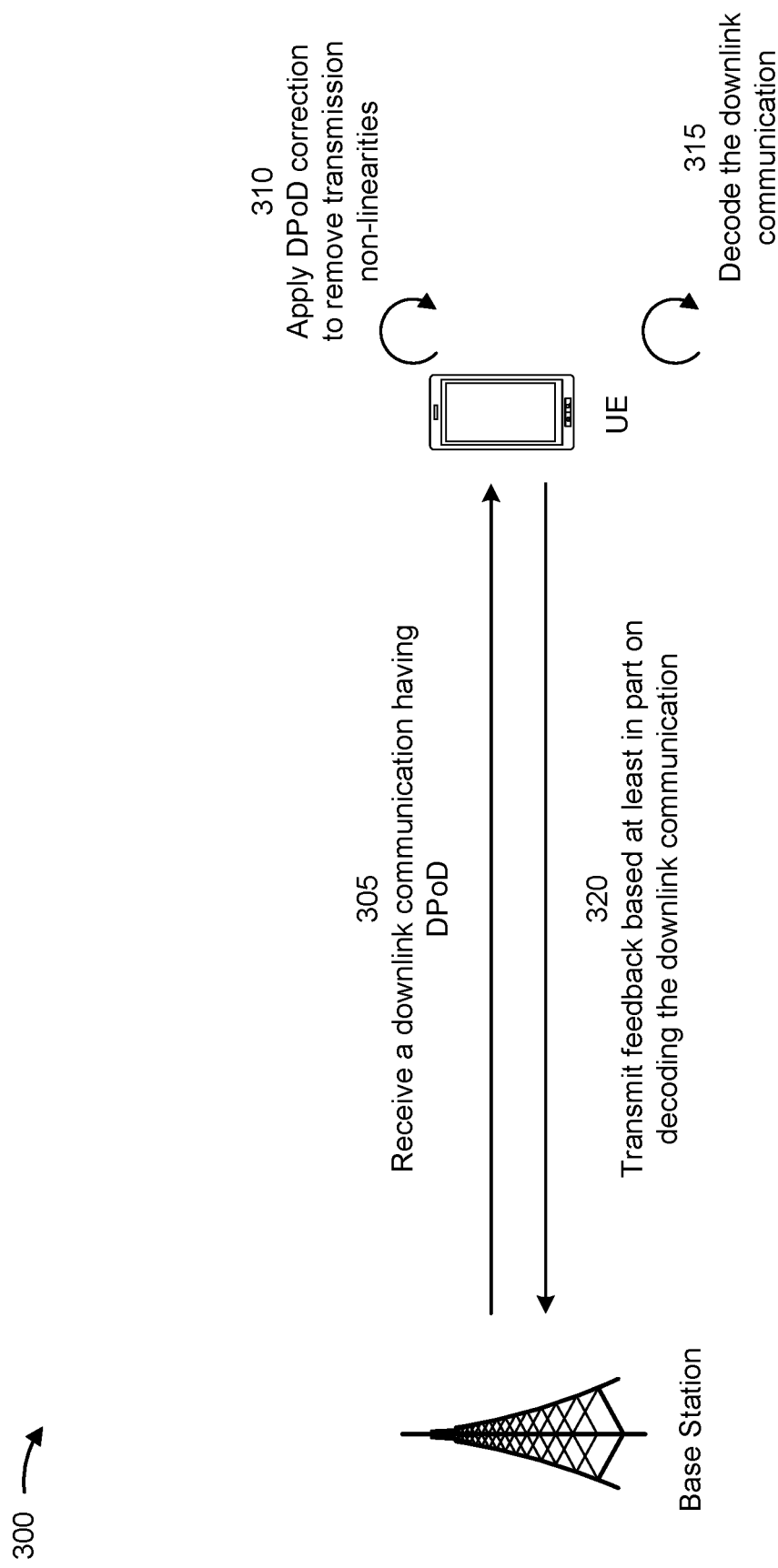
FIG. 3 is a diagram illustrating an example of transmitting and receiving a communication having digital post-distortion (DPoD), in accordance with the present disclosure.

FIG. 3 is a diagram illustrating an example 300 of transmitting and receiving a communication having DPoD, in accordance with the present disclosure. As shown in FIG. 3, a base station (e.g., a network node) and a UE may communicate via a wireless link. The base station and the UE may have established the wireless link prior to operations shown in FIG. 3.

As shown by reference number 305, the base station may transmit, and the UE may receive, a downlink communication having DPoD. DPoD may include distortion to a signal that may be inserted, or caused, by a power amplifier of a transmitting device. The downlink communication may have DPoD based at least in part on the base station transmitting the downlink communication with a power that is near a power amplifier (PA) compression point. For example, a transmitting device may transmit signals with increasing non-linearity as power amplification increases. For example, a PA of the base station may distort a signal as a result of a relatively high peak-to-average power ratio (PAPR). The base station may transmit the downlink communication with the power that is near the PA compression point to increase coverage, capacity, and/or signal strength (e.g., a signal-to-noise ratio (SNR)) of a downlink signal that carries the downlink communication.

As shown by reference number 310, the UE may apply DPoD correction to remove transmission non-linearities from sampling of the downlink communication. For example, the UE may reconstruct transmission non-linearities and subtract the transmission non-linearities from a received signal (e.g., in an iterative process). The UE may receive one or more signals (e.g., y_n) of the downlink communication that are mapped to resources in a time domain and a frequency domain. The UE may apply a discrete Fourier transform (DFT) component to transform the signals into frequency domain signals (e.g., Y_K). After DFT, the UE may perform a DPoD correction process on the frequency domain signals to remove non-linear noise from the signals.

The receiving device may perform the DPoD correction process iteratively, where in each iteration, a DPoD component may perform hard decision slicing (e.g., using a hard demapper/slicer component). Hard decision slicing uses sliced symbols in the frequency domain (e.g., Y_K) to reconstruct the time domain signal (e.g., an estimation of the time domain signal) as generated by the transmitting device before power amplification. The reconstructed time domain signal (e.g., X_k) is then passed through a non-linear model (e.g., a D(X) estimator component) to estimate and or correct for non-linearity of the time domain signal and produce an estimated non-linearity of the time domain signal (e.g., D_K).

The estimated non-linearity (e.g., D_K) may then be removed (e.g., subtracted) from the time domain signal (e.g., Y_K) by a combiner component. After estimating and removing the non-linearity (e.g., non-linear noise, or error), the DPoD process may proceed with further iterations or continue with signal demapping and decoding. For example, the UE may demap output from the combiner component (e.g., using the demapper component) to generate a log-likelihood ratio (LLR) demapped signal (e.g., LLR_b) that has corrected PA nonlinearity.

As shown by reference number 315, the UE may decode the downlink communication. For example, a decoder of the UE may decode the demapped signal to generate a payload of the signal (b_k). The UE may determine whether the downlink communication is correctly decoded based at least in part on one or more parameters of the downlink communication. For example, the UE may perform a cyclic redundancy check (CRC) on the downlink communication to determine whether the downlink communication is correctly decoded.

As shown by reference number 320, the UE may transmit, and the base station may receive, feedback based at least in part on decoding the downlink communication. For example, the UE may transmit an acknowledgment (ACK) if the UE correctly receives the downlink communication or a negative ACK (NACK) if the UE fails to correctly receive the downlink communication.

As indicated above, FIG. 3 is provided as an example. Other examples may differ from what is described with regard to FIG. 3.

Although applying DPoD correction may improve communications between a network node (e.g., a base station) and a UE, a challenge arises when non-square precoding is applied to the downlink communication. Non-square precoding may be applied when a number of antenna ports at a transmitting device (e.g., the network node) is greater than a number of layers of the downlink communication. For example, when multiple antenna ports are used to transmit a single layer of the downlink communication, the precoding is non-square precoding. In these cases, demodulation reference signals (DMRS) may be allocated per layer (and precoded with the data signal), which may obstruct the UE from efficiently tracking a channel of the downlink communication to each of the antenna ports of the network node. Without tracking the channel (e.g., a channel response) to a single antenna port, the UE may be unable to subtract the transmission non-linearities (e.g., post channel) from signal samples of the downlink communication. Based at least in part on the UE being unable to subtract the transmission non-linearities, the UE may fail to correctly decode the downlink communication having DPoD, which may consume communication, network, computing, and/or power resources to report and correct (e.g., using re-transmission of the downlink communication). Additionally, or alternatively, the network node may be unable to transmit the downlink communication, or a re-transmission of the downlink communication, using PA power that is near a compression point, which may reduce signal strength, decrease spectral efficiency (e.g., based at least in part on operating with a reduced SNR or signal-to-interference-plus-noise ratio (SINR)), and/or increased communication errors, each of which may consume communication, network, computing, and/or power resources.

In some aspects described herein, a UE may apply DPoD correction based at least in part on antenna correlation of antenna ports of the network node and/or using spatial basis functions associated with the antenna correlation. For example, the UE may use correlation between transmitting antennas to reduce a number of dimensions for channel estimation used for DPoD correction. In some aspects, the UE may project a subset of eigenvectors of a correlation matrix $R_{tx}$ of the antenna ports of the network node, where the subset of eigenvectors contains sufficient channel energy for channel estimation needed for DPoD correction. Estimating a channel for DPoD correction may be supported based at least in part on a number of spatial basis functions being less than a number of transmission antenna ports used to transmit the downlink communication ($N_{sp} < N_{Tx}$), which reduces complexity and does not require tracking a channel of the downlink communication to each of the antenna ports of the network node.

An example channel model for estimation can be described as follows:

$$y = [X_1 \ldots X_{N_{tx}}] \begin{bmatrix} H_1 \\ \vdots \\ H_{N_{tx}} \end{bmatrix} + n = [X_1 \ldots X_{N_{tx}}] \begin{bmatrix} F_c & 0 & 0 \\ 0 & \ddots & 0 \\ 0 & 0 & F_c \end{bmatrix} \begin{bmatrix} h_1 \\ \vdots \\ h_{N_{tx}} \end{bmatrix} +$$

$$n = [X_1 \ldots X_{N_{tx}}] \begin{bmatrix} F_c & 0 & 0 \\ 0 & \ddots & 0 \\ 0 & 0 & F_c \end{bmatrix} \cdot (U_{N_{sp}} \otimes I_M) \cdot \begin{bmatrix} c_1 \\ \vdots \\ c_{N_{sp}} \end{bmatrix} + n$$

An eigen decomposition of the transmission correlation matrix $R_{tx}$ is used to derive $U_{N_{sp}}$: $R_{tx} = U\Sigma U^H$, where $U_{N_{sp}}$ are the $N_{sp}$ columns of U with the $N_{sp}$ highest eigenvalues (e.g., eigenvalues having highest energy). Columns of $U_{N_{sp}}$ are referred to herein as basis functions that are used to perform DPoD correction (e.g., through channel estimation).

When large antenna arrays are used (e.g., a network node and/or an RU having >64 antenna ports), a correlation between the antennas may increase based at least in part on physical limitations of network node and/or RU dimensions and antenna spacing. In this way, transmission antennas may be projected to spatial basis functions. A limiting parameter for channel estimation and/or application of DPoD may be a number of independent spatial domain basis functions $N_{sp}$ instead of the number of transmission antenna ports. To apply the antenna correlation to perform DPoD correction (e.g., for a non-square precoded downlink communication), the UE may obtain a number of basis functions such that: $N_{sp} * B_f * B_t \leq REs$, where $B_f$ is number of basis functions in a frequency domain for channel estimation (this is the support of the power delay profile), $B_t$ is a number of basis functions in a time domain to describe the channel time variations, and REs is number of REs in an allocation associated with the downlink communication.

In some aspects, the UE may obtain the spatial basis functions via downlink signaling from the network node. For example, the downlink signaling may include an indication of an antenna correlation model of the network node, an indication (e.g., an explicit indication) of the spatial basis functions, or a set of downlink reference signals configured to support estimation of the antenna correlation model and/or the spatial basis functions, among other examples. In some aspects, a type of downlink signaling may be based at least in part on a capability of the UE. For example, the downlink signaling may include an indication of the antenna correlation model based at least in part on the UE indicating support for obtaining the spatial basis functions from the antenna correlation model. Additionally, or alternatively, the downlink signaling may include the set of downlink reference signals based at least in part on the UE indicating support for obtaining the spatial basis functions and/or the antenna correlation model from the set of downlink reference signals. In some aspects, the network node may transmit the indication of the spatial basis functions (conserving processing resources of the UE) based at least in part on the UE indicating a lack of support for obtaining the spatial basis functions from the antenna correlation model and/or the set of reference signals. In some aspects, the network node may transmit the downlink signaling based at least in part on the UE indicating support for DPoD correction and/or using spatial basis functions to estimate and correct non-linearities of signaling associated with the downlink communication.

In some aspects, the network node may transmit an indication of the antenna correlation model and/or the indication of the spatial basis functions via radio resource control (RRC) signaling or via one or more medium access control (MAC) control elements (CEs). In some aspects, the network node may transmit one or more parameters to assist the UE in determining the spatial basis functions, such as an indication of a number of transmission antenna ports used by the network node and/or a number of basis functions recommended for use in channel estimation for DPoD, among other examples.

The UE may determine the spatial basis functions from the antenna correlation model (e.g., using the one or more parameters, or independently from the one or more parameters) based at least in part on calculating a singular value decomposition (SVD) on the antenna correlation matrix and using eigenvectors that correspond to largest eigenvalues as the basis functions. The UE may estimate the spatial basis functions and form an estimation for each of the network node transmission antenna ports to be used in DPoD correction iterations.

In some aspects, the set of reference signals may support estimation of a correlation model of the network node and/or the spatial basis functions based at least in part on one or more parameters of the set of reference signals. The reference signals (e.g., pilots) may span a relatively long time (e.g., an amount of time that satisfies a threshold). For example, the reference signals may be multiplexed over multiple slots (e.g., occupying a single (e.g., last) symbol per slot) during the relatively long time. In some aspects, the reference signals may be non-precoded and/or may multiplex all antenna ports (e.g., similar to channel state information reference signals (CSI-RSs)). In some aspects, the correlation model may be expected to remain constant or to change less than a threshold amount over a threshold amount of time. In this way, the network node may transmit the reference signals as aperiodic reference signals and/or based at least in part on a request from the UE.

Based at least in part on the UE using spatial basis functions to estimate a channel and perform DPoD correction, the UE may increase a likelihood of correctly decoding the downlink communication having DPoD, which may conserve communication, network, computing, and/or power resources that may have otherwise been used to report and correct (e.g., using re-transmission of the downlink communication) an incorrectly decoded downlink communication. Additionally, or alternatively, the network node may be able to transmit the downlink communication, or a re-transmission of the downlink communication, using PA power that is near a compression point, which may improve signal strength, improve spectral efficiency (e.g., based at least in part on operating with an increased SNR or SINR), and/or reduced communication errors, each of which may conserve communication, network, computing, and/or power resources.

Figure 4:
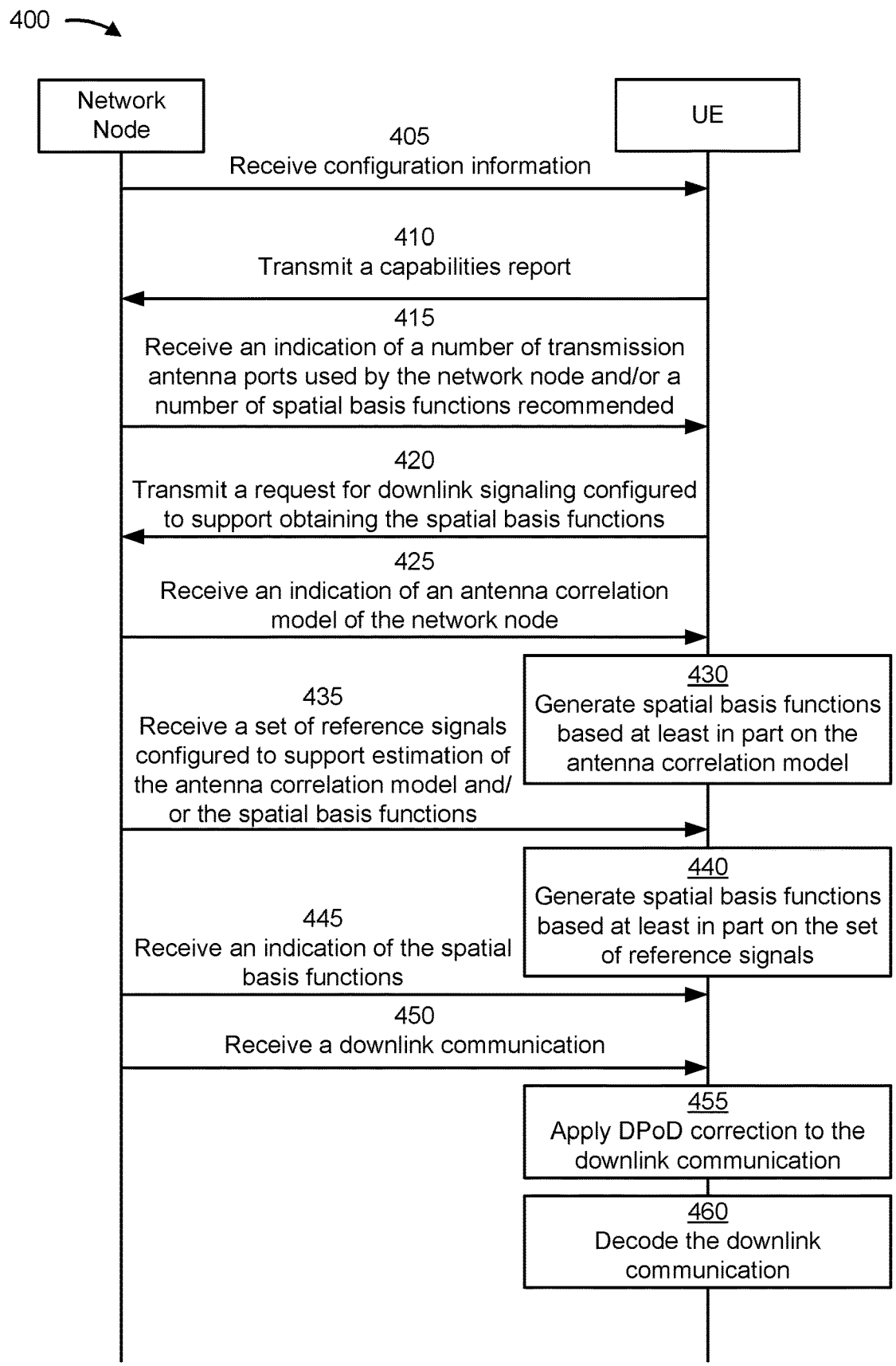
FIG. 4 is a diagram illustrating an example associated with DPoD correction, in accordance with the present disclosure.

FIG. 4 is a diagram of an example 400 associated with DPoD correction, in accordance with the present disclosure. As shown in FIG. 4, a network node (e.g., base station 110 and/or one or more devices that are part of a C-RAN, D-RAN, or vRAN, among other examples) may communicate with a UE (e.g., UE 120). In some aspects, the network node and the UE may be part of a wireless network (e.g., wireless network 100). The UE and the network node may have established a wireless connection prior to operations shown in FIG. 4. Operations described in FIG. 4 may be used when the network node transmits downlink communications using a non-square precoding matrix. For example, the operations may be applied when a number of antenna ports used by the network node is not a same number as a number of layers of the downlink communications (e.g., a number of antenna ports used by the network node is greater than the number of layers). In some aspects, the operations described in FIG. 4 may be used when the network node transmits downlink communications using a square precoding matrix.

As shown by reference number 405, the network node may transmit, and the UE may receive, configuration information. In some aspects, the UE may receive the configuration information via one or more of RRC signaling, one or more MAC CEs, and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to report a capability for applying DPoD correction based at least in part on spatial basis functions associated with antenna ports. In some aspects, the configuration information may indicate that the UE is to indicate one or more types of downlink signaling that the UE supports for obtaining the spatial basis functions (e.g., an antenna correlation model, reference signals, and/or a direct indication of the spatial basis functions, among other examples). In some aspects, the configuration information may indicate that the UE is to transmit a request for the downlink signaling configured to support obtaining the spatial basis functions. In some aspects, the configuration information may indicate that the UE is to receive and/or use an indication of a number of transmission antenna ports used by the network node and/or a number of spatial basis functions recommended for DPoD correction.

The UE may configure itself based at least in part on the configuration information. In some aspects, the UE may be configured to perform one or more operations described herein based at least in part on the configuration information.

As shown by reference number 410, the UE may transmit, and the network node may receive, a capabilities report. In some aspects, the capabilities report may indicate UE support for DPoD correction to decode a downlink communication. In some aspects, the capabilities report may include an indication of support for applying DPoD correction based at least in part on spatial basis functions associated with antenna ports. In some aspects, the capabilities report may include an indication of support for obtaining (e.g., determining or generating) the spatial basis functions based at least in part on one or more types of downlink signaling (e.g., an antenna correlation model, reference signals, and/or a direct indication of the spatial basis functions, among other examples).

As shown by reference number 415, the UE may receive, and the network node may transmit, an indication of a number of transmission antenna ports used by the network node and/or a number of spatial basis functions recommended to the UE for use in channel estimation and/or DPoD correction. For example, the network node may indicate a recommendation to use a number of spatial basis functions that is proportional to a number of antenna ports that are usable by the network node to transmit the downlink communication. In some aspects, the network node may indicate a recommendation to use a number of spatial basis functions that are proportional to a number of antenna ports that the network node intends to use to transmit the downlink communication. In some aspects, the network node may indicate a recommendation to use a number of spatial basis functions that is based at least in part on locations and location-based relationships between the antenna ports of the network node.

As shown by reference number 420, the UE may transmit, and the network node may receive, a request for downlink signaling configured to support the UE obtaining the spatial basis functions.

The network node may transmit the downlink signaling based at least in part on the request or independently from the request (e.g., in absence of the request) using request-based transmissions (e.g., in response to a request), aperiodic transmissions, and/or periodic transmissions (e.g., with a periodicity that satisfies a threshold), among other examples. The network node may transmit the downlink signaling as an indication of an antenna correlation mode, a set of reference signals, or an indication of the spatial basis functions (e.g., an explicit indication), among other examples, as described, for example, in connection with reference signals 425-445.

As shown by reference number 425, the UE may receive, and the network node may transmit, an indication of an antenna correlation model of the network node. In some aspects, the UE may receive the indication of the antenna correlation model as a matrix representation of relationships between antenna ports of the network node. In some aspects, the UE may receive the indication of the correlation model within RRC signaling and/or one or more MAC CEs.

As shown by reference number 430, the UE may generate spatial basis functions based at least in part on the antenna correlation model. In some aspects, UE may derive the spatial basis functions from the antenna correlation model based at least in part on calculating an SVD on a matrix representation of the antenna correlation model and using eigenvectors that correspond to highest eigenvalues as the spatial basis functions.

As shown by reference number 435, the UE may receive a set of reference signals configured to support estimation of the antenna correlation model and/or the spatial basis functions. In some aspects, the set of reference signals may support estimation of the correlation model and/or obtaining the spatial basis functions based at least in part on a duration of time spanned by the set of reference signals (e.g., an amount of time that satisfies a threshold), the set of reference signals being non-precoded, and/or the set of reference signals being multiplexed on the antenna ports of the network node, among other examples.

In some aspects, the set of reference signals may include aperiodic reference signals or request-based reference signals. For example, the UE may transmit, and the network node may receive, a request for the set of reference signals and/or other downlink signaling that supports the UE obtaining the spatial basis functions. The network node may transmit, and the UE may receive, the set of reference signals based at least in part on the UE transmitting the request for the set of reference signals.

In some aspects, the reference signals may be low-overhead reference signals. For example, the reference signals may be multiplexed with low density in one or more additional communications.

As shown by reference number 440, the UE may generate the spatial basis functions based at least in part on the set of reference signals. In some aspects, based at least in part on the set of reference signals being configured to support estimation of the antenna correlation model, the UE may obtain the antenna correlation model and then generate the spatial basis functions based at least in part on the antenna correlation model as described herein. In some aspects, the UE may generate the spatial basis function directly (e.g., without first estimating the antenna correlation model).

As shown by reference number 445, the UE may receive, and the network node may transmit, an indication of the spatial basis functions. For example, the network node may transmit an explicit indication of the spatial basis functions. In some aspects, the UE may receive the indication of the spatial basis functions within RRC signaling and/or one or more MAC CEs.

In some aspects, the network node may transmit the indication of the spatial basis functions based at least in part on the UE lacking support, and/or transmitting an indication of a lack of support, for generating the spatial basis functions based at least in part on the antenna correlation model or based at least in part on the set of reference signals, among other examples. In some aspects, the network node may transmit the indication of the spatial basis functions based at least in part on the UE failing in an attempt to generate the spatial basis functions based at least in part on the antenna correlation model or based at least in part on the set of reference signals, among other examples.

As shown by reference number 450, the UE may receive, and the network node may transmit, a downlink communication. The downlink communication may have DPoD based at least in part on the network node transmitting the downlink communication with a power that is near a PA compression point. For example, the network node may transmit the downlink communication with a power that is near the PA compression point to increase coverage, capacity, and/or signal strength of a downlink signal that carries the downlink communication.

As shown by reference number 455, the UE may apply DPoD correction to the downlink communication. The DPoD correction may be based at least in part on applying the spatial basis functions to estimate a channel and/or mapping values of a channel response to one or more antenna ports of the network node. In some aspects, the UE may estimate power amplifier parameters (e.g., non-linearities) for the antenna ports of the network node based at least in part on the spatial basis functions. For example, the UE may perform channel estimation for each network node antenna port based at least in part on combining (e.g., summing) the spatial basis functions with estimated coefficients associated with the channel estimations associated with the network node antenna ports. The UE may generate corrected samples of the downlink communication based at least in part on DPoD correcting of the antenna ports of the network node.

As shown by reference number 460, the UE may decode the downlink communication based at least in part on the DPoD correction improving a quality of signaling that carries the downlink communication. For example, the UE may demodulate the downlink communication based at least in part on the corrected samples of the downlink communication Based at least in part on the UE using spatial basis functions to estimate a channel and perform DPoD correction, the UE may increase a likelihood of correctly decoding the downlink communication having DPoD, which may conserve communication, network, computing, and/or power resources that may have otherwise been used to report and correct (e.g., using re-transmission of the downlink communication) an incorrectly decoded downlink communication. Additionally, or alternatively, the network node may be able to transmit the downlink communication, or a re-transmission of the downlink communication, using PA power that is near a compression point, which may improve signal strength, improve spectral efficiency (e.g., based at least in part on operating with an increased SNR or SINK), and/or reduced communication errors, each of which may conserve communication, network, computing, and/or power resources.

As indicated above, FIG. 4 is provided as an example. Other examples may differ from what is described with regard to FIG. 4.

Figure 5:
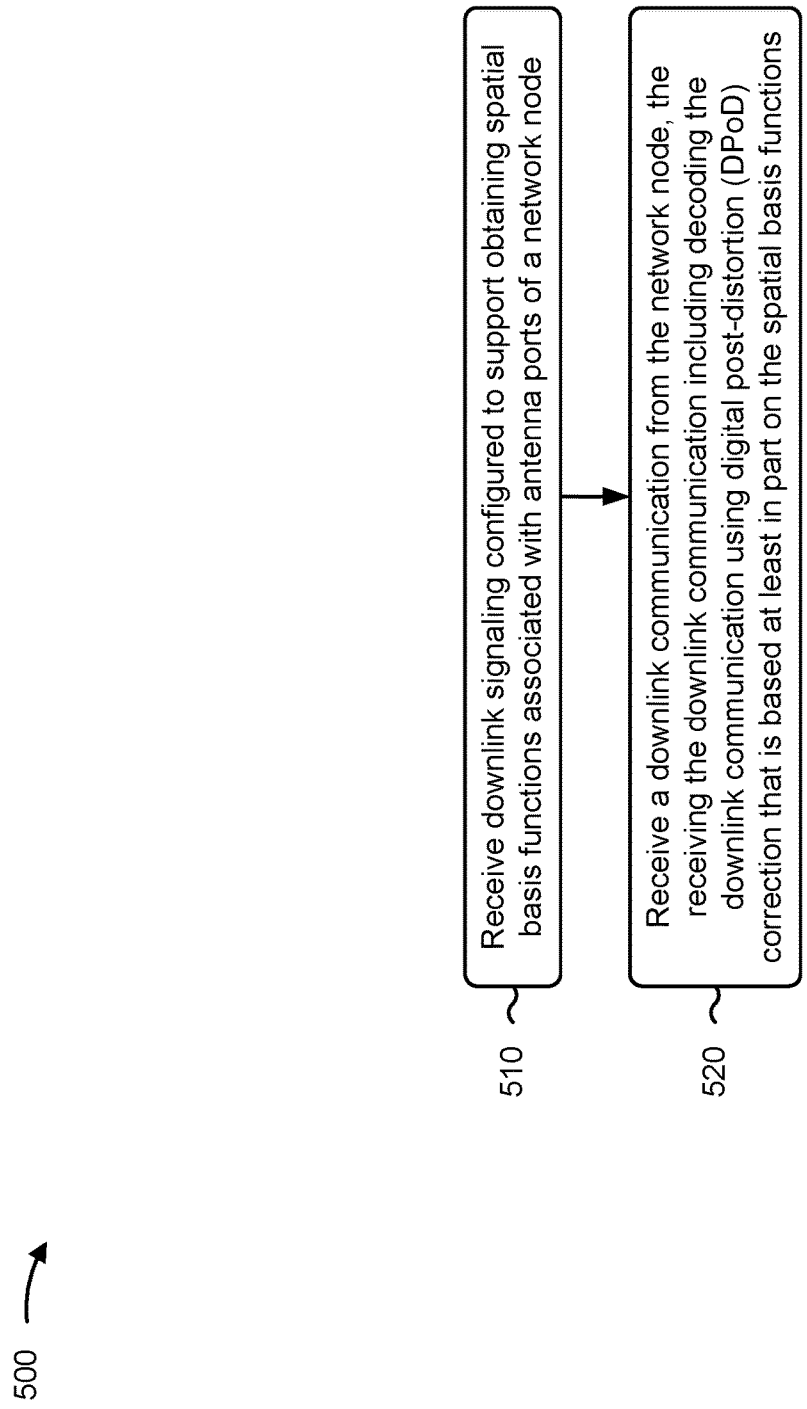
FIGS. 5 and 6 are diagrams illustrating example processes associated with DPod correction, in accordance with the present disclosure.

FIG. 5 is a diagram illustrating an example process 500 performed, for example, by a UE, in accordance with the present disclosure. Example process 500 is an example where the UE (e.g., UE 120) performs operations associated with DPod correction.

As shown in FIG. 5, in some aspects, process 500 may include receiving downlink signaling configured to support obtaining spatial basis functions associated with antenna ports of a network node (block 510). For example, the UE (e.g., using communication manager 140 and/or reception component 702, depicted in FIG. 7) may receive downlink signaling configured to support obtaining spatial basis functions associated with antenna ports of a network node, as described above.

As further shown in FIG. 5, in some aspects, process 500 may include receiving a downlink communication from the network node, the receiving the downlink communication including decoding the downlink communication using DPoD correction that is based at least in part on the spatial basis functions (block 520). For example, the UE (e.g., using communication manager 140 and/or reception component 702, depicted in FIG. 7) may receive a downlink communication from the network node, the receiving the downlink communication including decoding the downlink communication using DPoD correction that is based at least in part on the spatial basis functions, as described above.

Process 500 may include additional aspects, such as any single aspect or any combination of aspects described below and/or in connection with one or more other processes described elsewhere herein.

In a first aspect, the downlink signaling comprises an indication of an antenna correlation model of the network node.

In a second aspect, alone or in combination with the first aspect, decoding the downlink communication using DPoD correction comprises one or more of generating the spatial basis functions based at least in part on the antenna correlation model, estimating, based at least in part on the spatial basis functions, power amplifier parameters for the antenna ports of the network node, generating corrected samples of the downlink communication based at least in part on DPoD correcting of the antenna ports of the network node, or demodulating the downlink communication based at least in part on the corrected samples of the downlink communication.

In a third aspect, alone or in combination with one or more of the first and second aspects, the downlink signaling comprises an indication of the spatial basis functions.

In a fourth aspect, alone or in combination with one or more of the first through third aspects, the downlink signaling comprises the indication of the spatial basis functions based at least in part on a lack of support for the UE to generate the spatial basis functions using an antenna correlation model of the network node.

In a fifth aspect, alone or in combination with one or more of the first through fourth aspects, the downlink signaling comprises a set of reference signals configured to support estimation of one or more of a correlation model of the network node or the spatial basis functions.

In a sixth aspect, alone or in combination with one or more of the first through fifth aspects, the set of reference signals are configured to support estimation of the correlation model of the network node based at least in part on one or more of a duration of time spanned by the set of reference signals, the set of reference signals being non-precoded, or the set of reference signals being multiplexed on the antenna ports of the network node.

In a seventh aspect, alone or in combination with one or more of the first through sixth aspects, process 500 includes one or more of receiving the set of reference signals as aperiodic reference signals, transmitting a request for the set of reference signals, or receiving the set of reference signals based at least in part on transmitting the request for the set of reference signals.

In an eighth aspect, alone or in combination with one or more of the first through seventh aspects, process 500 includes receiving one or more of an indication of a number of transmission antennas used by the network node to transmit the downlink communication, or an indication of a number of spatial basis functions recommended for performing DPoD correction on the downlink communication.

In a ninth aspect, alone or in combination with one or more of the first through eighth aspects, receiving the downlink signaling comprises receiving the downlink signaling via one or more of RRC signaling or one or more MAC CEs.

In a tenth aspect, alone or in combination with one or more of the first through ninth aspects, process 500 includes transmitting an indication of support for one or more of using DPoD correction to decode a downlink communication, or generating the spatial basis functions based at least in part on one or more of an antenna correlation model or a set of reference signals.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
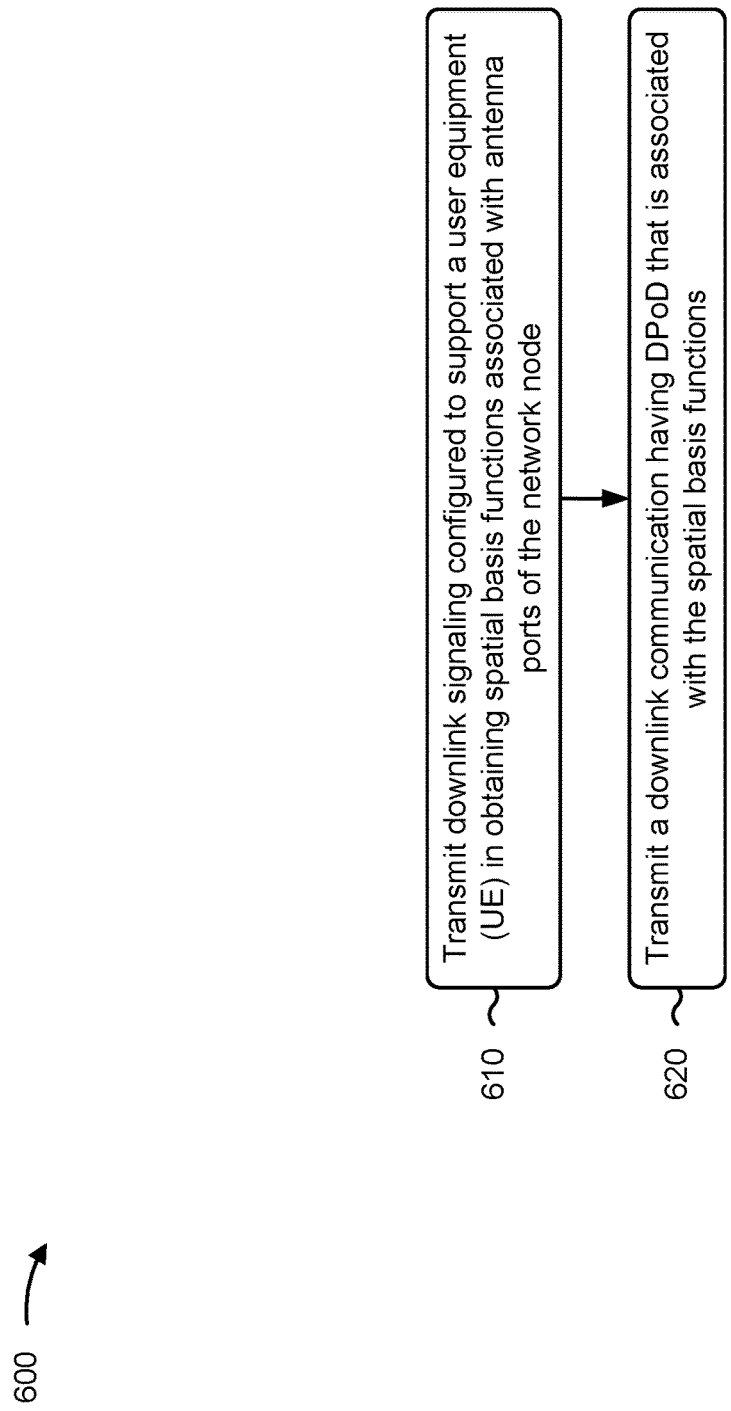

FIG. 6 is a diagram illustrating an example process 600 performed, for example, by a network node, in accordance with the present disclosure. Example process 600 is an example where the network node (e.g., base station 110) performs operations associated with DPoD correction.

As shown in FIG. 6, in some aspects, process 600 may include transmitting downlink signaling configured to support a UE in obtaining spatial basis functions associated with antenna ports of the network node (block 610). For example, the network node (e.g., using communication manager 150 and/or transmission component 804, depicted in FIG. 8) may transmit downlink signaling configured to support a UE in obtaining spatial basis functions associated with antenna ports of the network node, as described above.

As further shown in FIG. 6, in some aspects, process 600 may include transmitting a downlink communication having DPoD that is associated with the spatial basis functions (block 620). For example, the network node (e.g., using communication manager 150 and/or transmission component 804, depicted in FIG. 8) may transmit a downlink communication having DPoD that is associated with the spatial basis functions, as described above.

Process 600 may include additional aspects, such as any single aspect or any combination of aspects described below and/or in connection with one or more other processes described elsewhere herein.

In a first aspect, the downlink signaling comprises an indication of an antenna correlation model of the network node.

In a second aspect, alone or in combination with the first aspect, the antenna correlation model of the network node supports generation of the spatial basis functions for use in correcting the DPoD of the downlink communication.

In a third aspect, alone or in combination with one or more of the first and second aspects, the downlink signaling comprises an indication of the spatial basis functions.

In a fourth aspect, alone or in combination with one or more of the first through third aspects, the downlink signaling comprises the indication of the spatial basis functions based at least in part on a lack of support for the UE to generate the spatial basis functions using an antenna correlation model of the network node.

In a fifth aspect, alone or in combination with one or more of the first through fourth aspects, the downlink signaling comprises a set of reference signals configured to support estimation of one or more of a correlation model of the network node or the spatial basis functions.

In a sixth aspect, alone or in combination with one or more of the first through fifth aspects, the set of reference signals are configured to support estimation of the correlation model of the network node based at least in part on one or more of a duration of time spanned by the set of reference signals, the set of reference signals being non-precoded, or the set of reference signals being multiplexed on the antenna ports of the network node.

In a seventh aspect, alone or in combination with one or more of the first through sixth aspects, process 600 includes one or more of transmitting the set of reference signals as aperiodic reference signals, receiving a request for the set of reference signals, or transmitting the set of reference signals based at least in part on receiving the request for the set of reference signals.

In an eighth aspect, alone or in combination with one or more of the first through seventh aspects, process 600 includes transmitting one or more of an indication of a number of transmission antennas used by the network node to transmit the downlink communication, or an indication of a number of spatial basis functions recommended for performing DPoD correction on the downlink communication.

In a ninth aspect, alone or in combination with one or more of the first through eighth aspects, transmitting the downlink signaling comprises transmitting the downlink signaling via one or more of RRC signaling or one or more MAC CEs.

In a tenth aspect, alone or in combination with one or more of the first through ninth aspects, process 600 includes receiving an indication of support for the UE for one or more of using DPoD correction to decode a downlink communication, or generating the spatial basis functions based at least in part on one or more of an antenna correlation model or a set of reference signals.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
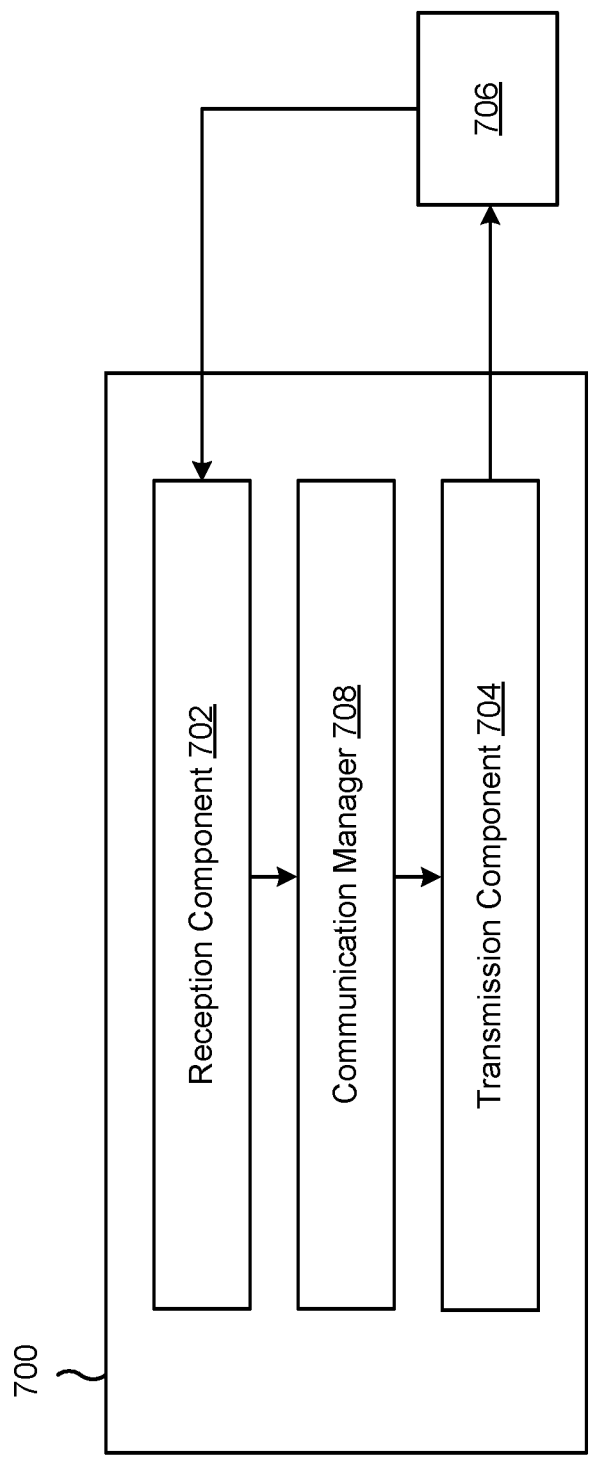
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 (e.g., the communication manager 140). The communication manager 708 may provide instructions to the transmission component 704 and/or the reception component 702 to perform one or more operations associated with communicating with the apparatus 706.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive downlink signaling configured to support obtaining spatial basis functions associated with antenna ports of a network node. The reception component 702 may receive a downlink communication from the network node, the receiving the downlink communication including decoding the downlink communication using DPoD correction that is based at least in part on the spatial basis functions.

The reception component 702 may receive one or more of an indication of a number of transmission antennas used by the network node to transmit the downlink communication, or an indication of a number of spatial basis functions recommended for performing DPoD correction on the downlink communication.

The transmission component 704 may transmit an indication of support for one or more of using DPoD correction to decode a downlink communication; or generating the spatial basis functions based at least in part on one or more of an antenna correlation model or a set of reference signals.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
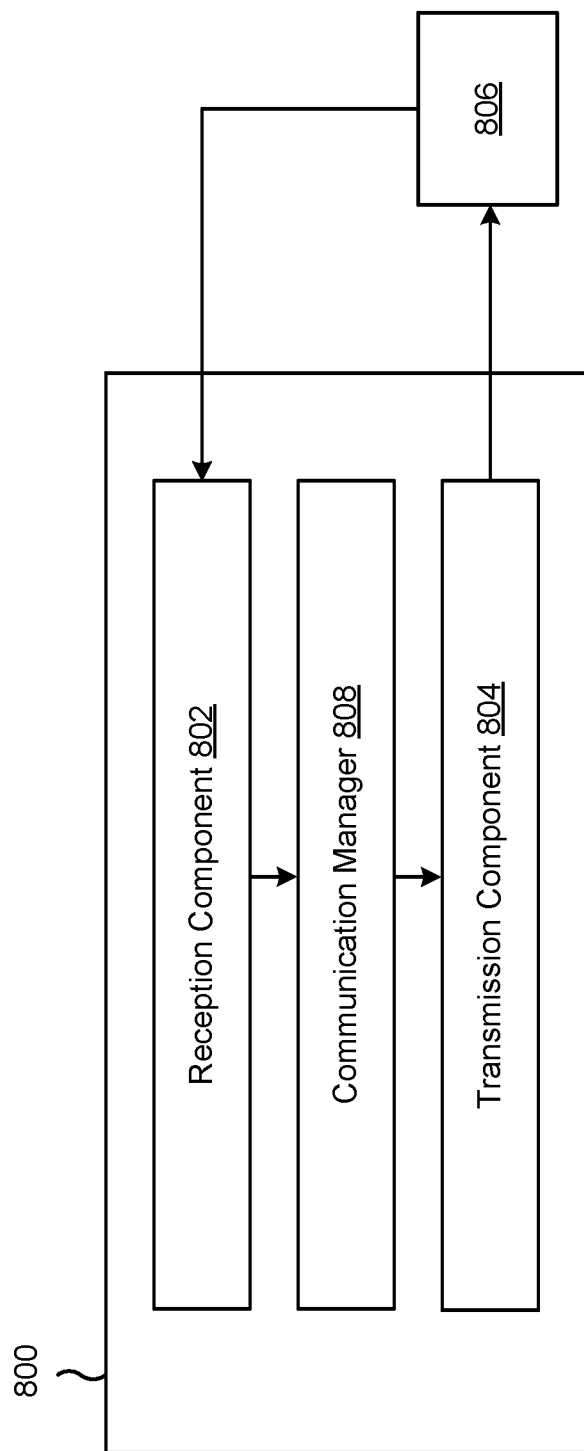

FIG. 8 is a diagram of an example apparatus 800 for wireless communication. The apparatus 800 may be a network node (e.g., one or more C-RAN, D-RAN or vRAN devices) or a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device)

using the reception component 802 and the transmission component 804. As further shown, the apparatus 800 may include a communication manager 808 (e.g., the communication manager 140). The communication manager 808 may provide instructions to the transmission component 804 and/or the reception component 802 to perform one or more operations associated with communicating with the apparatus 806.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit downlink signaling configured to support a UE in obtaining spatial basis functions associated with antenna ports of the network node. The transmission component 804 may transmit a downlink communication having DPoD that is associated with the spatial basis functions.

The transmission component 804 may transmit one or more of an indication of a number of transmission antennas used by the network node to transmit the downlink communication, or an indication of a number of spatial basis functions recommended for performing DPoD correction on the downlink communication.

The reception component 802 may receive an indication of support for the UE for one or more of using DPoD correction to decode a downlink communication; or generating the spatial basis functions based at least in part on one or more of an antenna correlation model or a set of reference signals.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
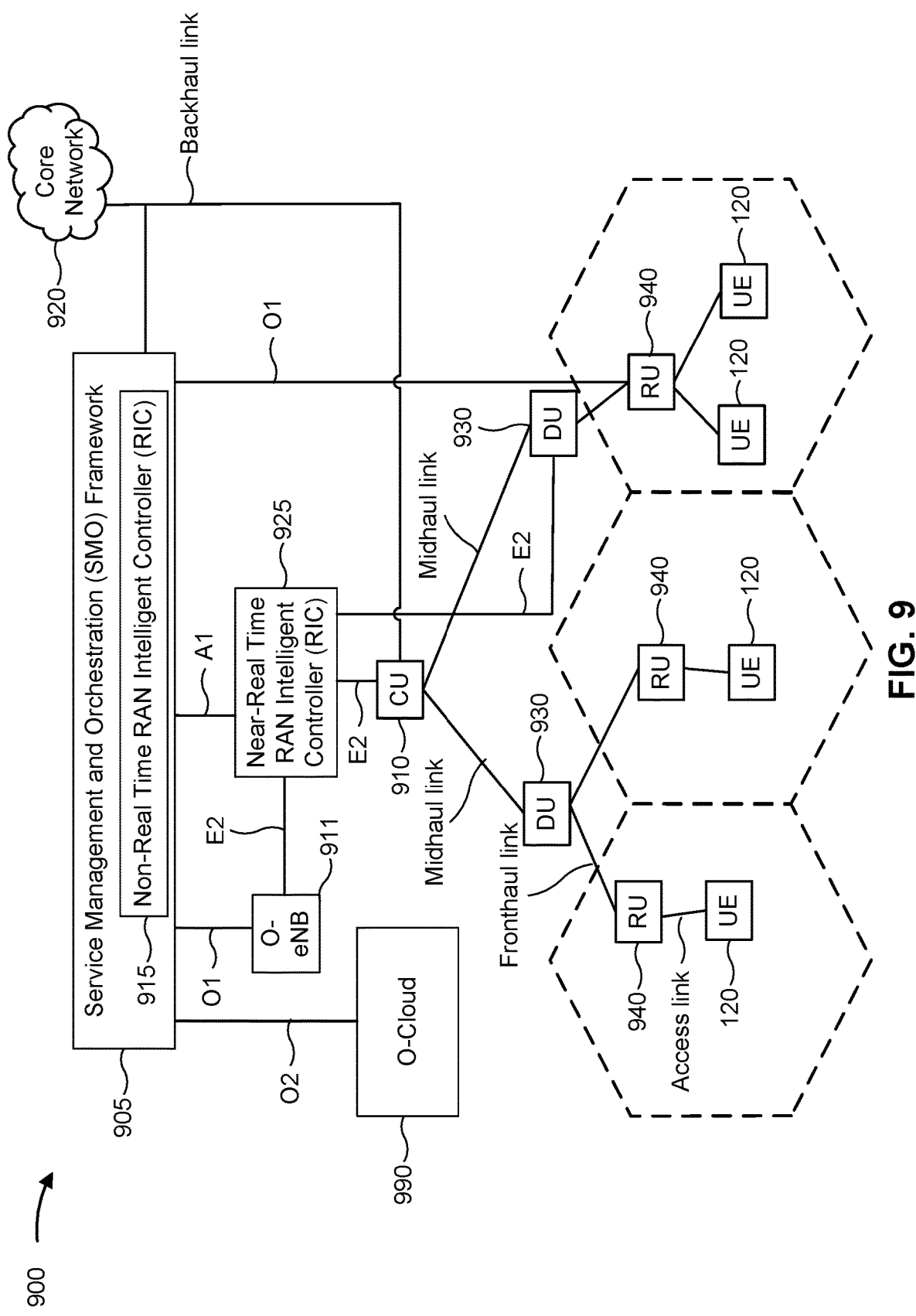
FIG. 9 is a diagram illustrating an example disaggregated base station architecture, in accordance with the present disclosure.

FIG. 9 is a diagram illustrating an example 900 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 9 may include one or more CUs 910 that can communicate directly with a core network 920 via a backhaul link, or indirectly with the core network 920 through one or more disaggregated base station units (such as a Near-Real Time (Near-RT) RAN Intelligent Controller (MC) 925 via an E2 link, or a Non-Real Time (Non-RT) RIC 915 associated with a Service Management and Orchestration (SMO) Framework 905, or both). A CU 910 may communicate with one or more DUs 930 via respective midhaul links, such as an F1 interface. The DUs 930 may communicate with one or more RUs 940 via respective fronthaul links. The RUs 940 may communicate with respective UEs 120 via one or more radio frequency (RF) access links. In some implementations, the UE 120 may be simultaneously served by multiple RUs 940.

Each of the units (e.g., the CUs 910, the DUs 930, the RUs 940), as well as the Near-RT RICs 925, the Non-RT RICs 915, and the SMO Framework 905, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 910 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 910. The CU 910 may be configured to handle user plane functionality (e.g., Central Unit—User Plane (CU-UP)), control plane functionality (e.g., Central Unit—Control Plane (CU-CP)), or a combination thereof. In some implementations, the CU 910 can be logically split into one or more CU-UP units and one or more CU-CP units. The CU-UP unit can communicate bidirectionally with the CU-CP unit via an interface, such as the E1 interface when implemented in an O-RAN configuration. The CU 910 can be implemented to communicate with the DU 930, as necessary, for network control and signaling.

The DU 930 may correspond to a logical unit that includes one or more base station functions to control the operation of one or more RUs 940. In some aspects, the DU 930 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 930 may further host one or more low-PHY layers. Each layer (or module) can be implemented with an interface configured to communicate signals with other layers (and modules) hosted by the DU 930, or with the control functions hosted by the CU 910.

Lower-layer functionality can be implemented by one or more RUs 940. In some deployments, an RU 940, controlled by a DU 930, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 940 can be implemented to handle over the air (OTA) communication with one or more UEs 120. In some implementations, real-time and non-real-time aspects of control and user plane communication with the RU(s) 940 can be controlled by the corresponding DU 930. In some scenarios, this configuration can enable the DU(s) 930 and the CU 910 to be implemented in a cloud-based RAN architecture, such as a vRAN architecture.

The SMO Framework 905 may be configured to support RAN deployment and provisioning of non-virtualized and virtualized network elements. For non-virtualized network elements, the SMO Framework 905 may be configured to support the deployment of dedicated physical resources for RAN coverage requirements which may be managed via an operations and maintenance interface (such as an O1 interface). For virtualized network elements, the SMO Framework 905 may be configured to interact with a cloud computing platform (such as an open cloud (O-Cloud) 990) to perform network element life cycle management (such as to instantiate virtualized network elements) via a cloud computing platform interface (such as an O2 interface). Such virtualized network elements can include, but are not limited to, CUs 910, DUs 930, RUs 940 and Near-RT RICs 925. In some implementations, the SMO Framework 905 can communicate with a hardware aspect of a 4G RAN, such as an open eNB (O-eNB) 911, via an O1 interface. Additionally, in some implementations, the SMO Framework 905 can communicate directly with one or more RUs 940 via an O1 interface. The SMO Framework 905 also may include a Non-RT RIC 915 configured to support functionality of the SMO Framework 905.

The Non-RT RIC 915 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 925. The Non-RT RIC 915 may be coupled to or communicate with (such as via an A1 interface) the Near-RT RIC 925. The Near-RT RIC 925 may be configured to include a logical function that enables near-real-time control and optimization of RAN elements and resources via data collection and actions over an interface (such as via an E2 interface) connecting one or more CUs 910, one or more DUs 930, or both, as well as an O-eNB, with the Near-RT RIC 925.

In some implementations, to generate AI/ML models to be deployed in the Near-RT RIC 925, the Non-RT RIC 915 may receive parameters or external enrichment information from external servers. Such information may be utilized by the Near-RT RIC 925 and may be received at the SMO Framework 905 or the Non-RT RIC 915 from non-network data sources or from network functions. In some examples, the Non-RT RIC 915 or the Near-RT RIC 925 may be configured to tune RAN behavior or performance. For example, the Non-RT RIC 915 may monitor long-term trends and patterns for performance and employ AI/ML models to perform corrective actions through the SMO Framework 905 (such as reconfiguration via 01) or via creation of RAN management policies (such as A1 policies).

As indicated above, FIG. 9 is provided as an example. Other examples may differ from what is described with regard to FIG. 9.

The following provides an overview of some Aspects of the present disclosure:

Aspect 1: A method of wireless communication performed by a user equipment (UE), comprising: receiving downlink signaling configured to support obtaining spatial basis functions associated with antenna ports of a network node; and receiving a downlink communication from the network node, the receiving the downlink communication including decoding the downlink communication using digital post-distortion (DPoD) correction that is based at least in part on the spatial basis functions.

Aspect 2: The method of Aspect 1, wherein the downlink signaling comprises an indication of an antenna correlation model of the network node.

Aspect 3: The method of Aspect 2, wherein decoding the downlink communication using DPoD correction comprises one or more of: generating the spatial basis functions based at least in part on the antenna correlation model; estimating, based at least in part on the spatial basis functions, power amplifier parameters for the antenna ports of the network node; generating corrected samples of the downlink communication based at least in part on DPoD correcting of the antenna ports of the network node; or demodulating the downlink communication based at least in part on the corrected samples of the downlink communication.

Aspect 4: The method of any of Aspects 1-3, wherein the downlink signaling comprises an indication of the spatial basis functions.

Aspect 5: The method of Aspect 4, wherein the downlink signaling comprises the indication of the spatial basis functions based at least in part on a lack of support for the UE to generate the spatial basis functions using an antenna correlation model of the network node.

Aspect 6: The method of any of Aspects 1-5, wherein the downlink signaling comprises a set of reference signals configured to support estimation of one or more of a correlation model of the network node or the spatial basis functions.

Aspect 7: The method of Aspect 6, wherein the set of reference signals are configured to support estimation of the correlation model of the network node based at least in part on one or more of: a duration of time spanned by the set of reference signals, the set of reference signals being non-precoded, or the set of reference signals being multiplexed on the antenna ports of the network node.

Aspect 8: The method of any of Aspects 6 or 7, further comprising one or more of: receiving the set of reference signals as aperiodic reference signals; transmitting a request for the set of reference signals; or receiving the set of reference signals based at least in part on transmitting the request for the set of reference signals.

Aspect 9: The method of any of Aspects 1-8, further comprising receiving one or more of: an indication of a number of transmission antennas used by the network node to transmit the downlink communication, or an indication of a number of spatial basis functions recommended for performing DPoD correction on the downlink communication.

Aspect 10: The method of any of Aspects 1-9, wherein receiving the downlink signaling comprises: receiving the downlink signaling via one or more of radio resource control signaling or one or more medium access control elements.

Aspect 11: The method of any of Aspects 1-10, further comprising transmitting an indication of support for one or more of: using DPoD correction to decode a downlink communication; or generating the spatial basis functions based at least in part on one or more of an antenna correlation model or a set of reference signals.

Aspect 12: A method of wireless communication performed by a network node, comprising: transmitting downlink signaling configured to support a user equipment (UE) in obtaining spatial basis functions associated with antenna ports of the network node; and transmitting a downlink communication having digital post-distortion (DPoD) that is associated with the spatial basis functions.

Aspect 13: The method of Aspect 12, wherein the downlink signaling comprises an indication of an antenna correlation model of the network node.

Aspect 14: The method of Aspect 13, wherein the antenna correlation model of the network node supports generation of the spatial basis functions for use in correcting the DPoD of the downlink communication.

Aspect 15: The method of any of Aspects 12-14, wherein the downlink signaling comprises an indication of the spatial basis functions.

Aspect 16: The method of Aspect 15, wherein the downlink signaling comprises the indication of the spatial basis functions based at least in part on a lack of support for the UE to generate the spatial basis functions using an antenna correlation model of the network node.

Aspect 17: The method of any of Aspects 12-16, wherein the downlink signaling comprises a set of reference signals configured to support estimation of one or more of a correlation model of the network node or the spatial basis functions.

Aspect 18: The method of Aspect 17, wherein the set of reference signals are configured to support estimation of the correlation model of the network node based at least in part on one or more of: a duration of time spanned by the set of reference signals, the set of reference signals being non-precoded, or the set of reference signals being multiplexed on the antenna ports of the network node.

Aspect 19: The method of any of Aspects 17 or 18, further comprising one or more of: transmitting the set of reference signals as aperiodic reference signals; receiving a request for the set of reference signals; or transmitting the set of reference signals based at least in part on receiving the request for the set of reference signals.

Aspect 20: The method of any of Aspects 12-19, further comprising transmitting one or more of: an indication of a number of transmission antennas used by the network node to transmit the downlink communication, or an indication of a number of spatial basis functions recommended for performing DPoD correction on the downlink communication.

Aspect 21: The method of any of Aspects 12-20, wherein transmitting the downlink signaling comprises: transmitting the downlink signaling via one or more of radio resource control signaling or one or more medium access control control elements.

Aspect 22: The method of any of Aspects 12-21, further comprising receiving an indication of support for the UE for one or more of: using DPoD correction to decode a downlink communication; or generating the spatial basis functions based at least in part on one or more of an antenna correlation model or a set of reference signals.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive downlink signaling configured to support obtaining spatial basis functions associated with antenna ports of a network node; and
        receive a downlink communication from the network node, the receiving the downlink communication including decoding the downlink communication using digital post-distortion (DPoD) correction that is based at least in part on the spatial basis functions.

2. The UE of claim 1, wherein the downlink signaling comprises an indication of an antenna correlation model of the network node.

3. The UE of claim 2, wherein the one or more processors, to decode the downlink communication using DPoD correction, are configured to:
    generate the spatial basis functions based at least in part on the antenna correlation model;
    estimate, based at least in part on the spatial basis functions, power amplifier parameters for the antenna ports of the network node;
    generate corrected samples of the downlink communication based at least in part on DPoD correcting of the antenna ports of the network node; or
    demodulate the downlink communication based at least in part on the corrected samples of the downlink communication.

4. The UE of claim 1, wherein the downlink signaling comprises an indication of the spatial basis functions.

5. The UE of claim 4, wherein the downlink signaling comprises the indication of the spatial basis functions based at least in part on a lack of support for the UE to generate the spatial basis functions using an antenna correlation model of the network node.

6. The UE of claim 1, wherein the downlink signaling comprises a set of reference signals configured to support estimation of one or more of a correlation model of the network node or the spatial basis functions.

7. The UE of claim 6, wherein the set of reference signals are configured to support estimation of the correlation model of the network node based at least in part on one or more of:
 a duration of time spanned by the set of reference signals, the set of reference signals being non-precoded, or
 the set of reference signals being multiplexed on the antenna ports of the network node.

8. The UE of claim 6, wherein the one or more processors are further configured to one or more of:
 receive the set of reference signals as aperiodic reference signals;
 transmit a request for the set of reference signals; or
 receive the set of reference signals based at least in part on transmitting the request for the set of reference signals.

9. The UE of claim 1, wherein the one or more processors are further configured to receive one or more of:
 an indication of a number of transmission antennas used by the network node to transmit the downlink communication, or
 an indication of a number of spatial basis functions recommended for performing DPoD correction on the downlink communication.

10. The UE of claim 1, wherein the one or more processors, to receive the downlink signaling, are configured to:
 receive the downlink signaling via one or more of radio resource control signaling or one or more medium access control control elements.

11. The UE of claim 1, wherein the one or more processors are further configured to transmit an indication of support for one or more of:
 use DPoD correction to decode a downlink communication; or
 generate the spatial basis functions based at least in part on one or more of an antenna correlation model or a set of reference signals.

12. A network node for wireless communication, comprising:
 a memory; and
 one or more processors, coupled to the memory, configured to:
  transmit downlink signaling configured to support a user equipment (UE) in obtaining spatial basis functions associated with antenna ports of the network node; and
  transmit a downlink communication having digital post-distortion (DPoD) that is associated with the spatial basis functions.

13. The network node of claim 12, wherein the downlink signaling comprises an indication of an antenna correlation model of the network node.

14. The network node of claim 13, wherein the antenna correlation model of the network node supports generation of the spatial basis functions for use in correcting the DPoD of the downlink communication.

15. The network node of claim 12, wherein the downlink signaling comprises an indication of the spatial basis functions.

16. The network node of claim 15, wherein the downlink signaling comprises the indication of the spatial basis functions based at least in part on a lack of support for the UE to generate the spatial basis functions using an antenna correlation model of the network node.

17. The network node of claim 12, wherein the downlink signaling comprises a set of reference signals configured to support estimation of one or more of a correlation model of the network node or the spatial basis functions.

18. The network node of claim 17, wherein the set of reference signals are configured to support estimation of the correlation model of the network node based at least in part on one or more of:
 a duration of time spanned by the set of reference signals, the set of reference signals being non-precoded, or
 the set of reference signals being multiplexed on the antenna ports of the network node.

19. The network node of claim 17, wherein the one or more processors are further configured to one or more of:
 transmit the set of reference signals as aperiodic reference signals;
 receive a request for the set of reference signals; or
 transmit the set of reference signals based at least in part on receiving the request for the set of reference signals.

20. The network node of claim 12, wherein the one or more processors are further configured to transmit one or more of:
 an indication of a number of transmission antennas used by the network node to transmit the downlink communication, or
 an indication of a number of spatial basis functions recommended for performing DPoD correction on the downlink communication.

21. The network node of claim 12, wherein the one or more processors, to transmit the downlink signaling, are configured to:
 transmit the downlink signaling via one or more of radio resource control signaling or one or more medium access control control elements.

22. The network node of claim 12, wherein the one or more processors are further configured to receive an indication of support for the UE for one or more of:
 use DPoD correction to decode a downlink communication; or
 generate the spatial basis functions based at least in part on one or more of an antenna correlation model or a set of reference signals.

23. A method of wireless communication performed by a user equipment (UE), comprising:
 receiving downlink signaling configured to support obtaining spatial basis functions associated with antenna ports of a network node; and
 receiving a downlink communication from the network node, the receiving the downlink communication including decoding the downlink communication using digital post-distortion (DPoD) correction that is based at least in part on the spatial basis functions.

24. The method of claim 23, wherein the downlink signaling comprises an indication of an antenna correlation model of the network node.

25. The method of claim 23, wherein the downlink signaling comprises an indication of the spatial basis functions.

26. The method of claim 23, wherein the downlink signaling comprises a set of reference signals configured to support estimation of one or more of a correlation model of the network node or the spatial basis functions.

27. A method of wireless communication performed by a network node, comprising:
 transmitting downlink signaling configured to support a user equipment (UE) in obtaining spatial basis functions associated with antenna ports of the network node; and
 transmitting a downlink communication having digital post-distortion (DPoD) that is associated with the spatial basis functions.

28. The method of claim 27, wherein the downlink signaling comprises an indication of an antenna correlation model of the network node.

29. The method of claim 27, wherein the downlink signaling comprises an indication of the spatial basis functions.

30. The method of claim 27, wherein the downlink signaling comprises a set of reference signals configured to support estimation of one or more of a correlation model of the network node or the spatial basis functions.

* * * * *